F. J. M. TAMMEN.
SAWING MACHINE.
APPLICATION FILED DEC. 17, 1913.
1,127,108.
Patented Feb. 2, 1915.
2 SHEETS—SHEET 1.
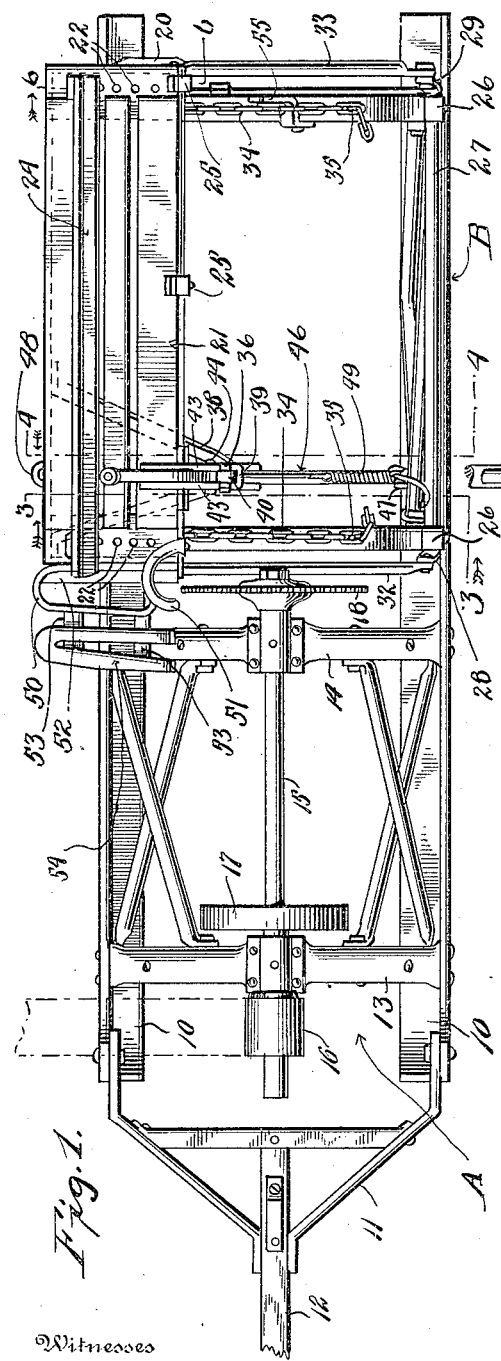
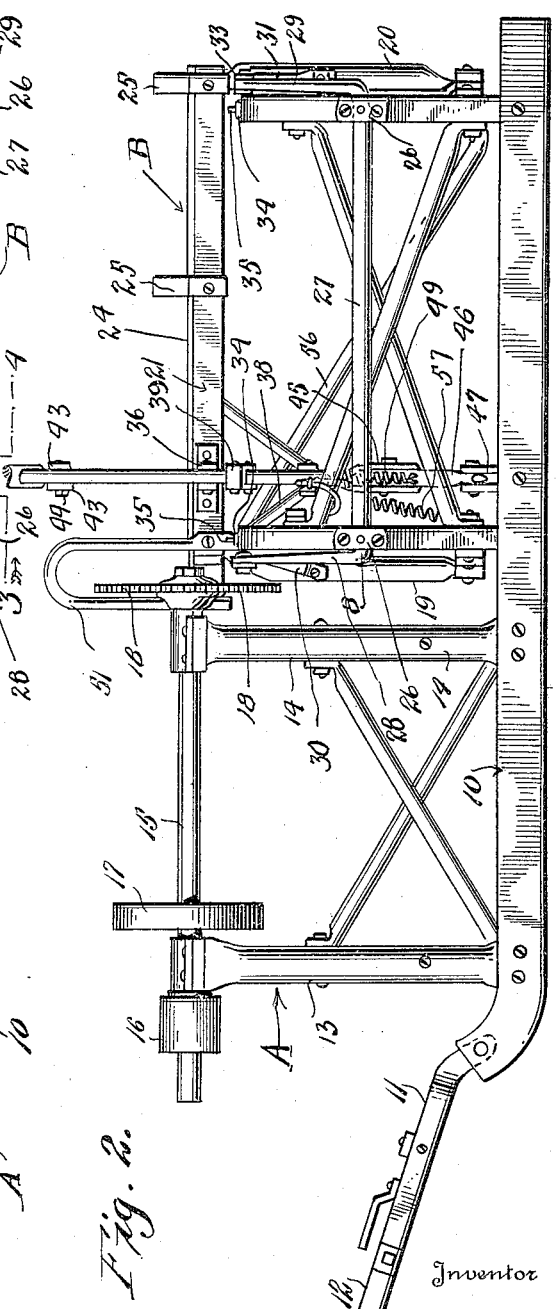
Fig. 1.
Fig. 2.
Witnesses
Inventor
F. J. M. Tammen
By
Attorneys

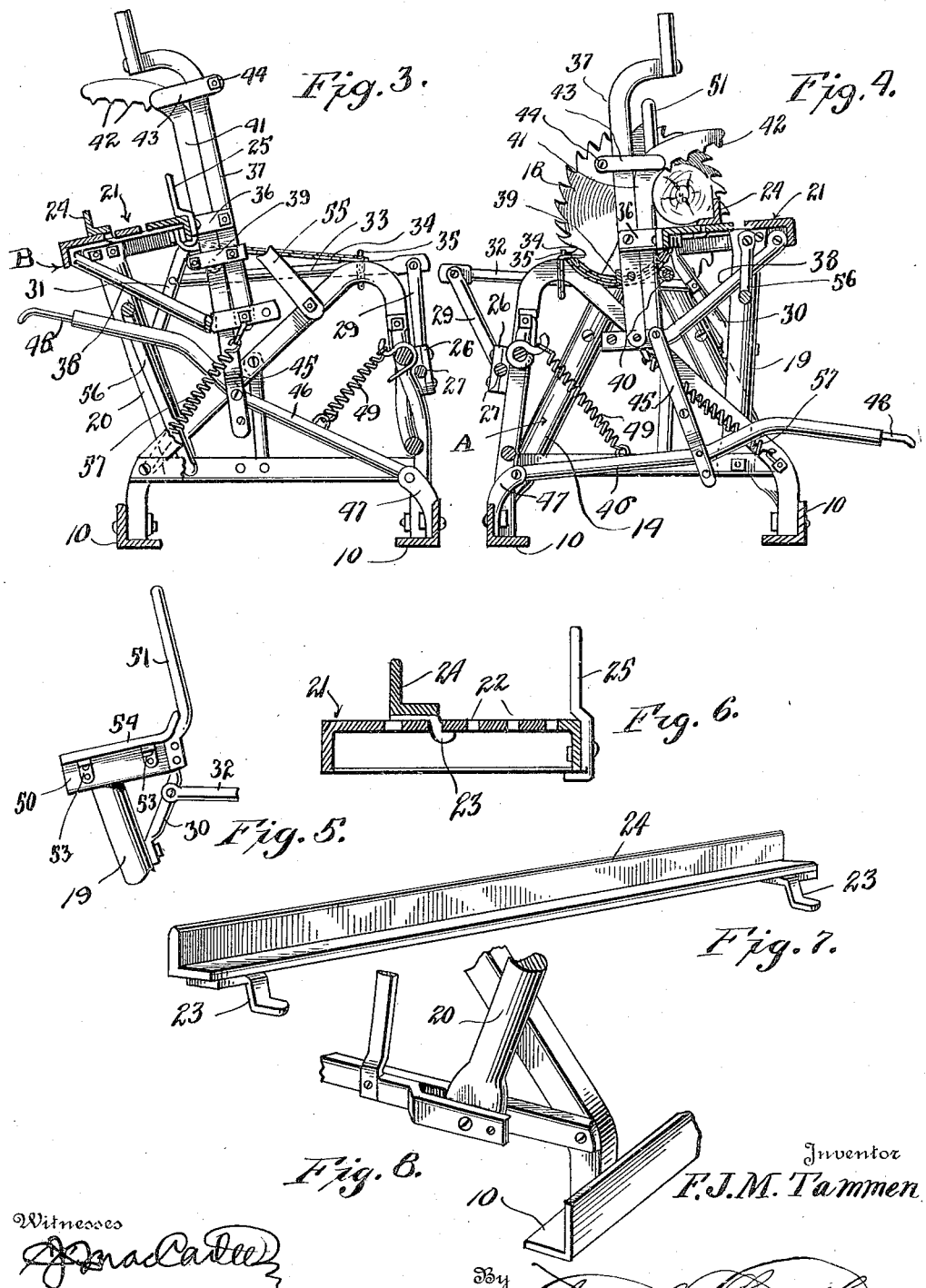

UNITED STATES PATENT OFFICE.

FRED J. M. TAMMEN, OF ALBERT, KANSAS.

SAWING-MACHINE.

1,127,108. Specification of Letters Patent. Patented Feb. 2, 1915.

Application filed December 17, 1913. Serial No. 807,308.

*To all whom it may concern:*

Be it known that I, FRED J. M. TAMMEN, a citizen of the United States, residing at Albert, in the county of Barton, State of Kansas, have invented certain new and useful Improvements in Sawing-Machines; and I do hereby declare the following to be a full, clear, and exact description of the invention, such as will enable others skilled in the art to which it appertains to make and use the same.

This invention relates to sawing machines.

The object of the invention resides in the provision of a machine particularly adapted for sawing logs and which can be readily moved from one locality to another to avoid the necessity of hauling the material to be operated upon.

A further object of the invention resides in the provision of a sawing machine which embodies a swinging work carriage and a work clamp and common means for engaging the clamp with the work and moving the carriage to dispose the work into initial engagement with the saw.

A still further object of the invention resides in the provision of a sawing machine which will be simple in construction, efficient in use and which may be manufactured and operated at comparatively small expense.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is plan view of a sawing machine constructed in accordance with the invention; Fig. 2, a rear view of the machine; Fig. 3, a section on the line 3—3 of Fig. 1; Fig. 4, a section on the line 4—4 of Fig. 1 with the work carrier swung to its limit toward the saw; Fig. 5, an end view of the carrier looking at the end thereof adjacent to the saw; Fig. 6, a section on the line 6—6 of Fig. 1; Fig. 7, a perspective view of the work gage detached from the carriage table, and Fig. 8, a perspective view showing the mounting of one of the carriage supporting arms.

Referring to the drawings the device is shown as comprising spaced runners 10 which have pivotally connected to one end a yoke 11 carrying a draft tongue 12 whereby draft animals may be attached for the purpose of drawing the machine along the ground. Mounted upon the runners 10 is a saw frame A including end members 13 and 14. Also mounted upon the runners 10 is a carriage frame B. Journaled upon the end members 13 and 14 is a shaft 15 which has fixed on the end thereof remote from the frame B a belt pulley 16 whereby said shaft may be rotated through the medium of connections with a suitable source of power. Fixed on the shaft 15 just inwardly of the end member 13 is a fly wheel 17 whereby the shaft is steadied during its rotation. Fixed on the end of the shaft 15 adjacent to the frame B and outwardly of the end member 14 is a circular saw 18.

Pivotally mounted on the frame B at each end of the latter and adjacent to the front of the machine are the lower ends of arms 19 and 20 and mounted upon the upper free ends of these arms is a work carriage 21 provided at each end with a transversely arranged series of openings 22 in which are adapted to be interchangeably engaged fingers 23 of a work gage 24. By this construction it will be apparent that the work gage 24 can be adjusted toward and away from the rear of the work carriage to conform with the size of the logs being operated upon. Secured to the rear edge of the work carriage 21 are stakes 25 against which the rear of the log abuts during the operation of sawing. Journaled in bearings 26 mounted on the rear of the frame B is a longitudinal shaft 27 the ends of which terminate in crank arms 28 and 29 connected to braces 30 and 31 by links 32 and 33 respectively, the brace 30 having one end connected to the carriage 21 and its other end to the arm 19, while the brace 31 has one end connected to the carriage 21 and its other end connected to the arm 20. By this construction it will be obvious that the work carriage 21 is mounted for swinging movement toward and away from the saw 18. The movement of the carriage 21 away from the saw 18 is limited by means of chains 34 corresponding ends of which are anchored to the carriage 21 while the links thereof are adapted for detachable engagement with securing fingers 35 mounted upon the frame B. By this construction it will be obvious that the limit of the movement of the carriage 21 away from the saw can be readily varied by increasing or decreasing the active length of the chains 34. Projecting from the edge of the carriage 21 adjacent to the shaft 27 are spaced ears 36 between which is secured a handle 37. The lower end of this handle 37 is also secured between bracket arms 38 depending from the carriage 21.

Secured to the handle 37 between the ears 36 and bracket arms 38 is a U-shaped member 39 which has journaled between the free ends of its arms a roller 40. Slidably mounted between the ears 36 and the arms of the U-shaped member 39 is a clamping bar 41 the upper end of which is directed over the carriage 21 and provided with work engaging teeth 42. Secured to the upper end of the clamping bar 41 are spaced arms 43 which embrace the handle 37 and are connected by a bolt 44. These arms 43 and bolt 44 also serve to slidably connect the bar 41 to the handle 37. Pivoted to the lower end of the bar 41 is an arm 45 and the free end of this arm is in turn pivoted to a lever 46 intermediate the ends of the latter. This lever is pivotally mounted upon a bracket 47 carried by the runner 10 adjacent to the shaft 27. The free end of the lever 46 terminates in a pedal 48 whereby same may be readily depressed with the foot or knee. The free end of the lever 46 is normally held in the position shown in Fig. 3 by means of a spring 49 one end of which is secured to said lever and the other end to the frame B. Secured to the end of the carriage 21 adjacent to the saw 18 is one arm of a U-shaped member 50, the arms of said member being disposed on opposite sides of the saw 18 as will be obvious. An arch 51 has one end secured to the carriage 21 and its other end secured to the arm of the member 50 remote from said carriage. By this construction it will be obvious that as the carriage 21 is moved toward the saw 18 the latter will pass between the legs of the arch 51 and between the arms of the member 50. Secured against the inner side of the arm of the member 50 which is attached to the carriage 21 is a fender strip 52 formed of wood which serves to prevent engagement of the saw 18 with metal in the event of the saw twisting slightly during its operation. The fender 52 also serves to efficiently support small pieces of timber during the sawing operation and prevent same from being drawn down between the arms of the member 50. Secured to the outer arm of the member 50 are brackets 53 which support a stop 54 adapted to engage the end member 14 to limit the movement of the carriage 21 toward the saw 18. The carriage 21 is also adapted to engage a stop 55 mounted upon the frame B to limit its movement toward the saw 18, it being noted that the engagement of the stop 54 with the member 14 occurs simultaneously with the engagement of the carriage 21 with the stop 55. The carriage 21 is strengthened by a brace 56 one end of which is connected to the bottom side of the carriage while the other end thereof is pivotally connected to the frame B. A balance spring 57 has one end secured to the bracket arms 38 and its other end to the frame B. This spring will be slightly tensioned by the movement of the carriage 21 toward the saw 18 and thereby assist the operator in returning the carriage to its normal position.

In the operation of the machine the log to be sawed is placed upon the carriage 21 and with one end thereof overlying the arms of the member 50. It will of course be understood that the gage 24 has been previously adjusted to conform to the diameter of the log being operated upon. The handle 37 is then gripped and the knee placed upon the pedal 48 and pushed downwardly. The free end of the lever 46 will thus be depressed and this movement of the lever will in turn move the clamping bar 41 downwardly until the teeth 42 engage in the log and lock the latter against axial rotation. Continued pressure upon the pedal 48 will swing the carriage 21 to bring the log into engagement with the saw 18. This initial movement of the carriage under the influence of pressure exerted upon the free end of the lever 46 is due to the fact that said lever is connected to the clamping bar 41 at the rear of the pivotal mounting of the carriage and the force exerted upon the lever will therefore be transmitted to the carriage through the clamping bar so as to swing the carriage toward the saw 18. Movement of the carriage is continued by pressure exerted against the handle 37 and the pedal 48 until the log is severed by the saw 18 when the parts are returned to their normal position.

What is claimed is:—

1. In a sawing machine, the combination of a frame, a rotatable saw mounted on said frame, spaced arms pivoted on the frame, a work carriage mounted on the free ends of said arms, a clamping bar slidably mounted on the work carriage, a lever pivoted on said frame, and connections between the lever and clamping bar disposed at the rear of the pivot of said arms whereby the depression of said lever will move the clamping bar into engagement with the work and continued depression of said lever will swing said arms and carriage to move the work on the latter into engagement with the saw.

2. In a sawing machine, the combination of a frame, a rotatable saw mounted on said frame, a work carriage pivotally mounted on said frame, a clamping bar slidably mounted on the work carriage, a lever pivoted on said frame, and connections between the lever and clamping bar disposed at the rear of the pivot of said work carriage whereby the depression of said lever will move the clamping bar into engagement with the work and continued depression of said lever will swing said carriage to move the work on the latter into engagement with the saw.

In testimony whereof, I affix my signature, in the presence of two witnesses.

FRED J. M. TAMMEN.

Witnesses:
CARL SCHNEIDER, Jr.,
CONRAD TAMMEN.